US008495647B2

(12) United States Patent
Kawachiya et al.

(10) Patent No.: US 8,495,647 B2
(45) Date of Patent: Jul. 23, 2013

(54) METHOD AND PROGRAM FOR RECORDING OBJECT ALLOCATION SITE

(75) Inventors: Kiyokuni Kawachiya, Kanagawa-ken (JP); Rei Odaira, Kanagawa-ken (JP); Tamiya Onodera, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 12/963,734

(22) Filed: Dec. 9, 2010

(65) Prior Publication Data

US 2011/0154354 A1 Jun. 23, 2011

(30) Foreign Application Priority Data

Dec. 22, 2009 (JP) ................. 2009-289944

(51) Int. Cl.
*G06F 9/46* (2006.01)
*G06F 9/44* (2006.01)

(52) U.S. Cl.
USPC ............................ 718/104; 717/108; 717/116

(58) Field of Classification Search
None
See application file for complete search history.

(56) References Cited

U.S. PATENT DOCUMENTS

| | | | | |
|---|---|---|---|---|
| 5,632,034 A * | 5/1997 | O'Farrell | ................ | 717/140 |
| 5,655,101 A * | 8/1997 | O'Farrell et al. | ............ | 711/148 |
| 5,692,183 A * | 11/1997 | Hapner et al. | ................ | 1/1 |
| 5,848,419 A * | 12/1998 | Hapner et al. | ................ | 1/1 |
| 6,105,041 A * | 8/2000 | Bennett et al. | ................ | 1/1 |
| 6,826,583 B1 * | 11/2004 | Flood et al. | ................ | 1/1 |
| 6,886,159 B2 * | 4/2005 | Onodera | ................ | 717/165 |
| 6,915,510 B1 * | 7/2005 | Tock et al. | ................ | 717/165 |
| 7,058,785 B1 * | 6/2006 | Ochotta | ................ | 711/202 |
| 8,161,464 B2 * | 4/2012 | Archambault et al. | ....... | 717/140 |
| 2010/0229159 A1 | 9/2010 | Odaira et al. | | |

FOREIGN PATENT DOCUMENTS

| | | |
|---|---|---|
| JP | 11-161502 A | 6/1999 |
| JP | 2000047879 A | 2/2000 |
| JP | 2002099449 A | 4/2002 |
| JP | 2003140899 A | 5/2003 |
| JP | 2004206644 A | 7/2004 |
| JP | 2006163686 A | 6/2006 |
| JP | 2009064217 A | 3/2009 |

OTHER PUBLICATIONS

Yuji Chiba, High-performance Write Barriers for Thread-local Garbage Collection, Information Processing Society of Japan (IPSJ), 2004, pp. 53-61, vol. 45, No. SIG5.

* cited by examiner

*Primary Examiner* — Van Nguyen
(74) *Attorney, Agent, or Firm* — Vazken Alexanian

(57) ABSTRACT

A method, system, and program for recording an object allocation site. In the structure of an object, a pointer to a class of an object is replaced by a pointer to an allocation site descriptor which is unique to each object allocation site, a common allocation site descriptor is used for objects created at the same allocation site, and the class of the object is accessed through the allocation site descriptor.

15 Claims, 10 Drawing Sheets

OBJECT-ORIENTED RUNTIME ENVIRONMENT

| | Physical memory usage (MB) | Number of classes | Number of allocation sites | Average number of live + dead objects |
|---|---|---|---|---|
| compiler.compiler | 915 | 1,518 | 11,521 | 19,867,612 |
| compiler.sunflow | 660 | 1,508 | 11,215 | 11,799,036 |
| compress | 485 | 1,202 | 7,494 | 59,720 |
| derby | 2,214 | 1,645 | 11,305 | 53,276,583 |
| mpegaudio | 111 | 1,232 | 10,676 | 48,705 |
| serial | 1,437 | 1,265 | 8,071 | 26,100,595 |
| sunflow | 143 | 1,284 | 8,384 | 1,255,192 |
| xml.transform | 315 | 2,248 | 19,083 | 2,229,105 |
| xml.validation | 340 | 1,440 | 9,535 | 3,392,094 |
| SPECjbb2005 | 2,340 | 981 | 6,269 | 34,891,413 |
| Eclipse | 637 | 6,819 | 29,508 | 9,508,075 |

FIG. 9

STRUCTURE OF ALLOCATION SITE DESCRIPTOR

METHOD AND PROGRAM FOR RECORDING OBJECT ALLOCATION SITE

CROSS REFERENCE TO RELATED APPLICATION

This application claims priority under 35 U.S.C. 119 from Japanese Application 2009-289944, filed Dec. 22, 2009, the entire contents of which are herein incorporated by reference.

BACKGROUND OF THE INVENTION

1. Field of the Invention

The present invention relates to a method of recording an object allocation site, and particularly to a method of recording an object allocation site with a low cost and to a program therefore.

2. Description of Related Art

In general the building of a large scale application by use of an object-oriented language such as JAVA®. One of problems involved in a system running such an application is that the system goes down once the heap is used up because a large number of created objects are not collected by garbage collection (GC). Important functions to address this problem are to obtain a memory dump at the time of system failure and to then determine in which code in an application each of the objects remaining in the heap are created, i.e., to determine an "object allocation site."

To achieve these functions, there is an approach of logging an object allocation site by use of Java virtual machine tool interface (JVMTI) or the like, every time an object is created. This approach, however, has problems of slowing down execution and of enormously increasing the size of a recording region. Besides, when using this approach it is difficult to collect characteristics of the object allocation sites at runtime and thus to use the collected characteristics for optimization. Meanwhile, another approach to achieve the aforementioned functions is to additionally provide an object itself with a region to record an object allocation site. This approach needs only a small overhead at runtime, but requires additional memory for the allocation site recording. For this reason, this approach is not adequate to solve a shortage in memory. Moreover, when using this approach it is difficult to collect information on the object allocation sites for optimization.

Conventional methods are disclosed in U.S. Application Publication 2010/0229159 A1, in Chiba, "High-performance Write Barriers for Thread-local Garbage Collection," in Information Processing Society of Japan (IPSJ) Transactions on Programming, Vol. 45, No. SIG5 (2004): pp. 53-61, and the like. These are a method of converting (or coding) information on an object allocation site and then embedding the converted (or coded) information in a region called "hashcode" which inherently exists in an object header of some Java environments. This method, however, is not applicable to an object model which has no such region. Moreover, this method is disadvantageous in that it involves an overhead such as a cost for converting the allocation site. Furthermore, since it is converted, the information on the allocation site is difficult to use at application runtime.

BRIEF SUMMARY OF THE INVENTION

To overcome these deficiencies, the present invention provides a method of recording an allocation site for an object, including: replacing a pointer included in an object structure of the object and pointing to a class of the object with a pointer to an allocation site descriptor which includes information on an allocation site at which the object is created and a pointer to the class of the object, using a common allocation site descriptor for objects created at a same allocation site, and accessing the class of the object by referring to the pointer to the class in the allocation site descriptor.

According to another aspect of the present invention, the present invention provides a system of recording an allocation site for an object, including: means for replacing a pointer included in an object structure of the object and pointing to a class of the object with a pointer to an allocation site descriptor which includes information on an allocation site at which the object is created and a pointer to the class of the object, means for using a common allocation site descriptor for objects created at a same allocation site, and means for accessing the class of the object by referring to the pointer to the class in the allocation site descriptor.

According to yet another aspect of the present invention, the present invention provides a computer program product for recording an allocation site for an object state, the computer program product including: a computer readable storage medium having computer readable program code embodied therewith, the computer readable program code including computer readable program code configured to: replace a pointer included in an object structure of the object and pointing to a class of the object with a pointer to an allocation site descriptor which includes information on an allocation site at which the object is created and a pointer to the class of the object, use a common allocation site descriptor for objects created at a same allocation site, and access the class of the object by referring to the pointer to the class in the allocation site descriptor.

BRIEF DESCRIPTION OF THE SEVERAL VIEWS OF THE DRAWINGS

FIG. 9 is a diagram which shows a result of measurement of the number of object allocation sites.

DETAILED DESCRIPTION OF THE PREFERRED EMBODIMENTS

In an object oriented language environment, an object is created by specifying a "class" which is a template for the object. The header of an object generally stores a pointer to a class so as to allow the class to be determined at runtime. FIG.

Figure 1:
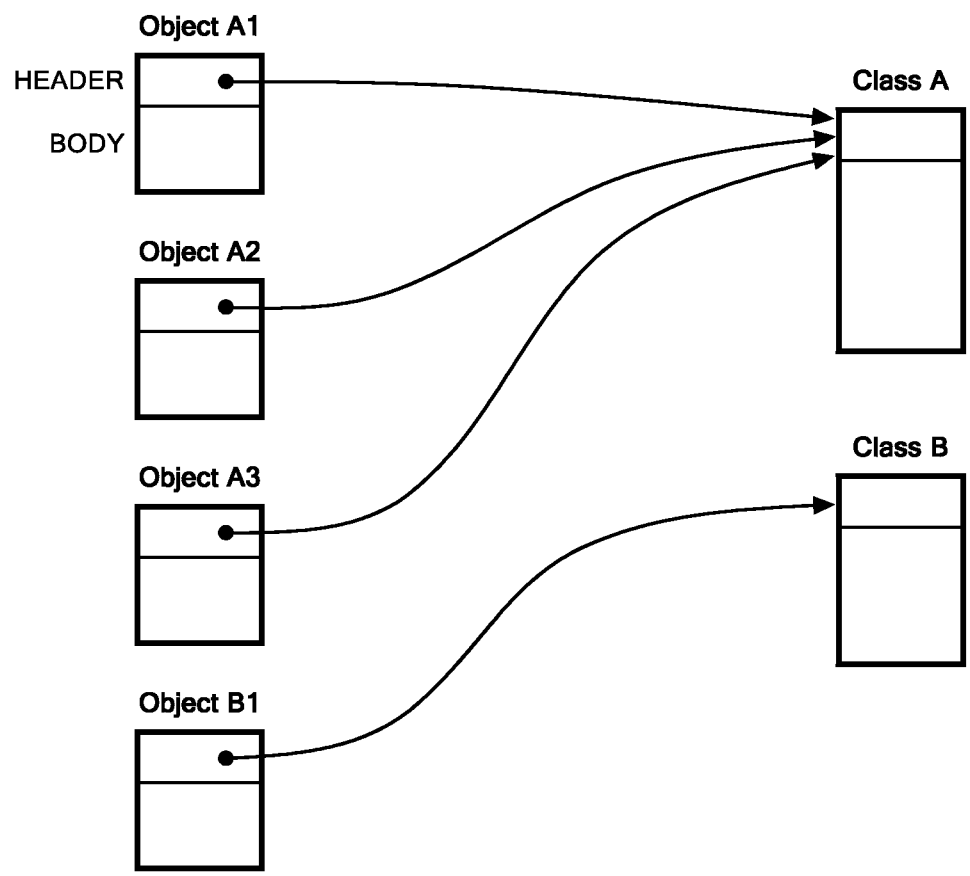
FIG. 1 is a diagram which shows a general structure of an object.

1 shows a general structure of an object. An object mainly includes a header and a body. Objects A1, A2, A3, and B1 in FIG. 1 are created by instantiating Class A and Class B which are each a template for a corresponding one of Objects A1, A2, A3, and B1.

If a language processor is capable of determining an object allocation site at application runtime, the processor can easily reallocate an object or optimize where an object is allocated by use of information on the object allocation site. In an embodiment of the present invention, an object stores a pointer to an "allocation site descriptor" in its object header, instead of storing a pointer to a class.

Figure 11:
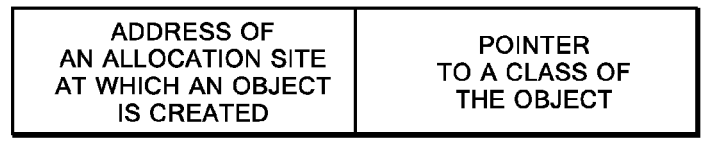
FIG. 11 is a diagram which shows a structure of an allocation site descriptor.

FIG. 11 shows a structure of an allocation site descriptor. The allocation site descriptor includes an address of an allocation site at which an object is created and a pointer to a class of the object.

Figure 2:
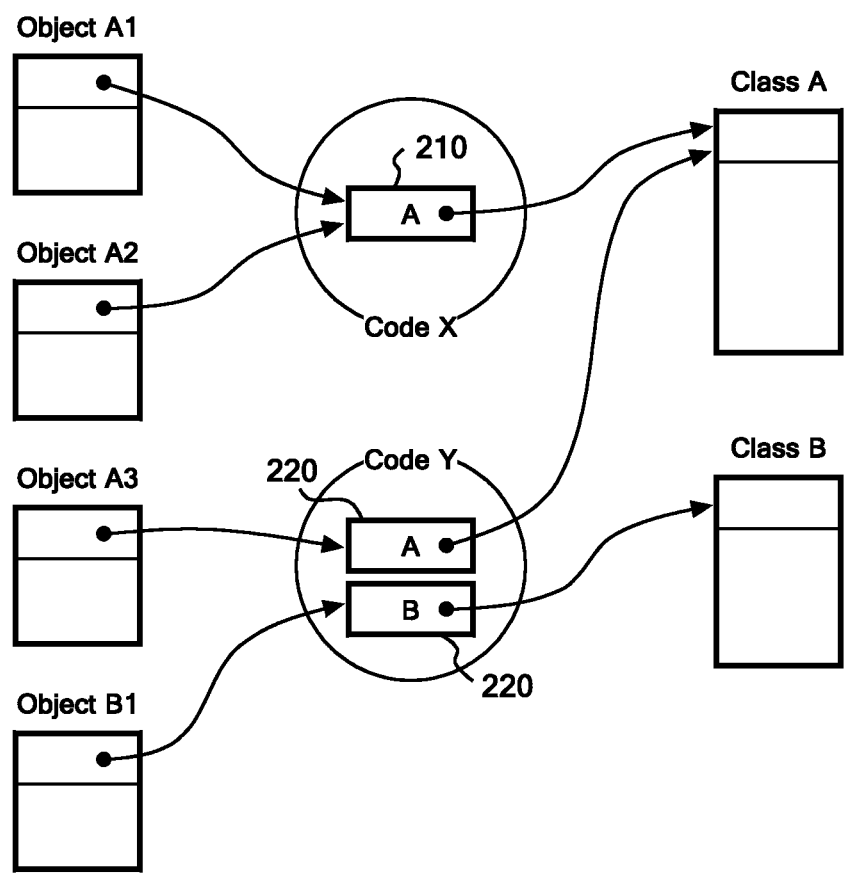
FIG. 2 is a diagram which shows a structure of an object according to the present invention.

Although the allocation site descriptor shown in FIG. 11 explicitly includes the allocation site address at which an object is created, it is more practical to determine the allocation site address by using code in which the allocation site descriptor exists. FIG. 2 shows an example of a structure of an object according to an embodiment of the present invention. Allocation site descriptors 210 and 220 each include a pointer to a class and information on a site in which an object is created. FIG. 2 shows three allocation site descriptors. In the structure shown in FIG. 2, each of the allocation site descriptors has only a pointer to a class, and the allocation site address in which an object is created is specified in code in which the allocation site descriptor exists. Hereinbelow, an address in which an object is created is described as an object allocation site.

The allocation site descriptor determines an allocation site of an object. In the example shown in FIG. 2, it is found that Objects A1 and A2 are created in Code X (210) while Objects A3 and B1 are created in Code Y (220). Here, no additional memory overhead is required for each of Objects A1, A2, A3 and B1, since a pointer to the allocation site descriptor is stored in a region which is originally used to store a pointer to a class by replacing the pointer to a class with the allocation site descriptor. Since the allocation site descriptor has a pointer to a class, following the pointer to a class allows accessing class information.

Objects created at the same site share the same allocation site descriptor. For this reason, the number of descriptors is much less than the number of objects, thereby making an additional memory overhead small. In this respect, if a region in a code instructing an object creation is used for the allocation site descriptor, it is possible to eliminate the additional memory overhead. Since the region for instructing an object creation is already provided, there is no need to prepare a region dedicated to the allocation site descriptor.

Figure 3:
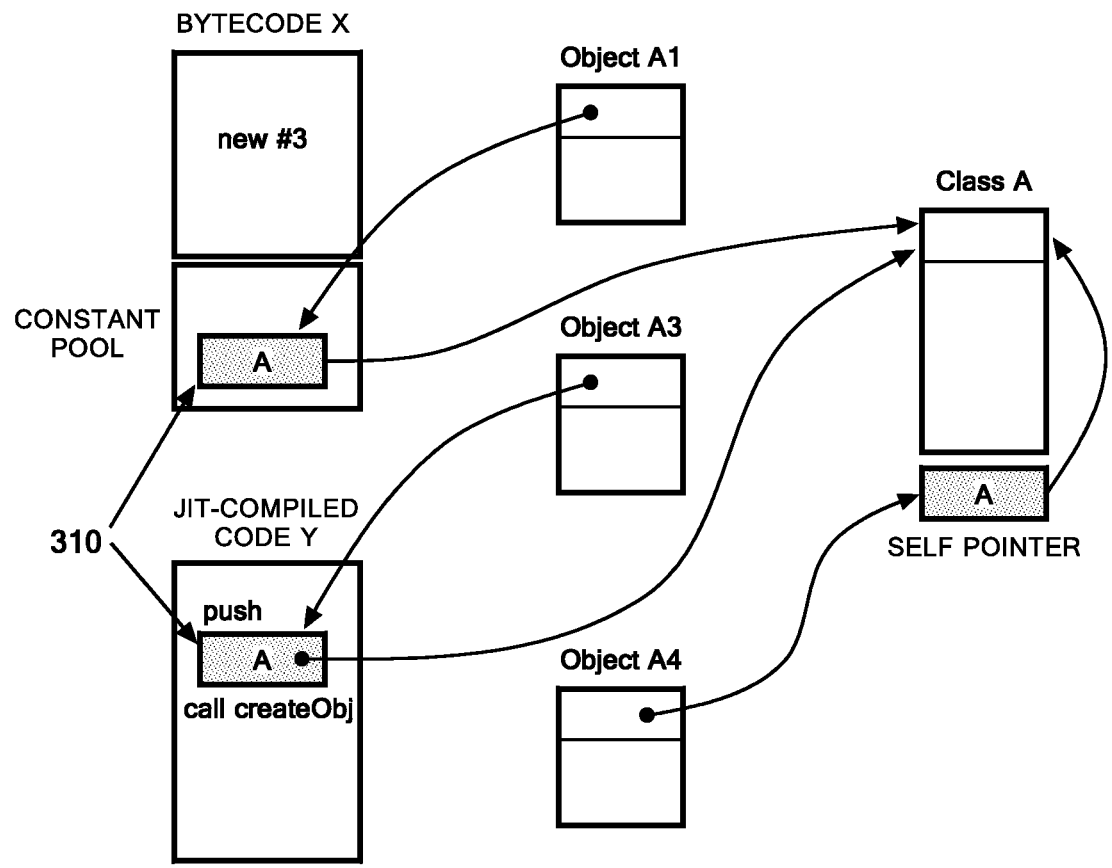
FIG. 3 is a diagram which shows an example in which an existing region is used as an allocation site descriptor.

FIG. 3 shows an example in which an already provided region is used for an allocation site descriptor 310. A class is specified to create an object. Information on the class is statically stored in code in many cases. Using such a region eliminates the need to secure a new memory area for the allocation site descriptor. For example, when a Java interpreter is executed, a (resolved) site of a constant pool indicated by a bytecode "new" is usable as a descriptor. Meanwhile, in a JIT-compiled code, a site in which class information to be given to a function for object creation (createObj, in FIG. 3) is included is usable as it is for an allocation site descriptor. In the former case, it is difficult to determine which "new" in the same class creates an object. This is a trade-off to avoid increasing of a memory overhead.

In a case where class information is dynamically specified as in a case of object creation by reflection, there may be no region usable for an allocation site descriptor. In this case, a special allocation site descriptor may be provided. If a "self pointer" as shown for Object A4 in FIG. 3, provided for each class is used as a descriptor, it is possible to keep the additional memory overhead small. Although the determination of an object allocation site is not possible in this case, such a case is rare.

Among those described above, only the self pointer involves an additional memory overhead. Nevertheless, this is not a serious problem because the number of classes is much less than the number of objects or the number of allocation sites. Furthermore, depending on implementation, some language processors already have one which is similar to the self pointer included therein. For this reason, the use thereof does not lead to a large overhead.

Figure 4:
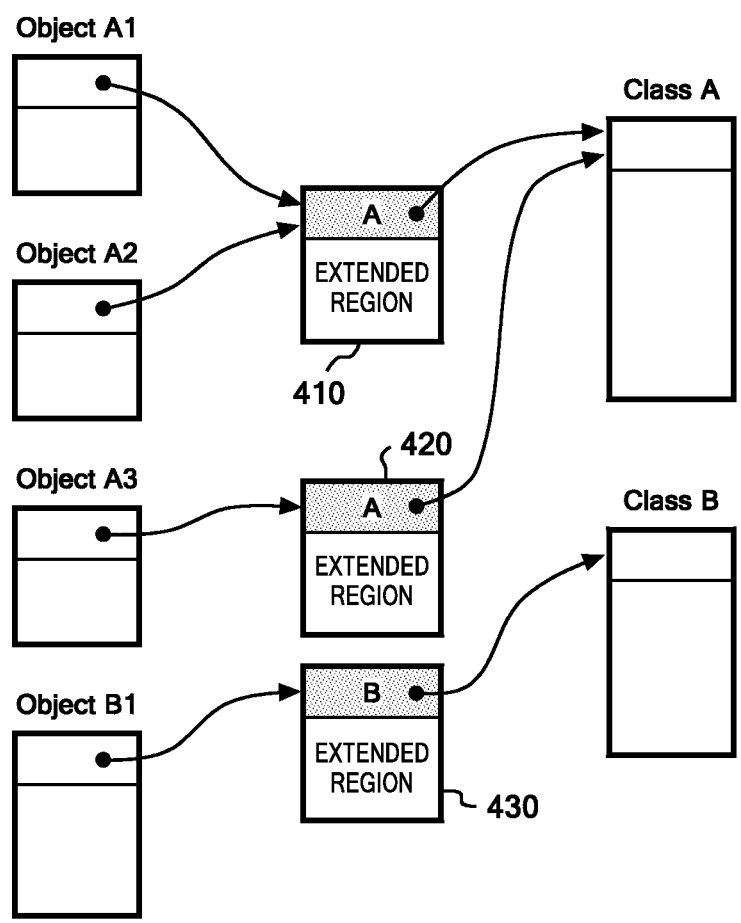
FIG. 4 is a diagram which shows an example of expansion for collecting information for each allocation site.

In the method of recording an allocation site of the present embodiment of the invention, an allocation site descriptor is prepared for each object allocation site. Accordingly, extending a region of the allocation site descriptor and collecting therein information for the allocation site enable an optimization of object allocation at application runtime. FIG. 4 shows an example of expansion of the allocation site descriptor for collecting therein information for each allocation site.

In FIG. 4, Objects A1 and A2 each store in its header a pointer to an allocation site descriptor 410. The allocation site descriptor 410 has a pointer to Class A and an extended region. Object A3 stores in its header a pointer to an allocation site descriptor 420. The allocation site descriptor 420 has a pointer to Class A and an extended region. Object B1 stores in its header a pointer to an allocation site descriptor 430. The allocation site descriptor 430 has a pointer to Class B and an extended region.

Statistical information may be stored in this extended region, such as the types of objects and the number of objects which refer to the allocation site descriptor.

The following are conceivable examples of the collected information and the optimization:
  The number of live objects is counted for each allocation site at the time of GC. If the number of live objects keeps increasing in an allocation site, a warning is given that the allocation sites for the objects might cause a memory leak.
  In a case of employing a generational GC, a ratio of objects promoted to an older generation region is calculated for each allocation site. If an object is to be created at an allocation site which has the high ratio, the object is determined to be created in the older generation region.

Extending the allocation site descriptor may make it difficult to use the aforementioned "already provided region" as it is. Even in this case, the feature of the present embodiment of the invention that the additional memory overhead is small is maintained because the number of allocation sites is much less than the number of objects.

Figure 5:
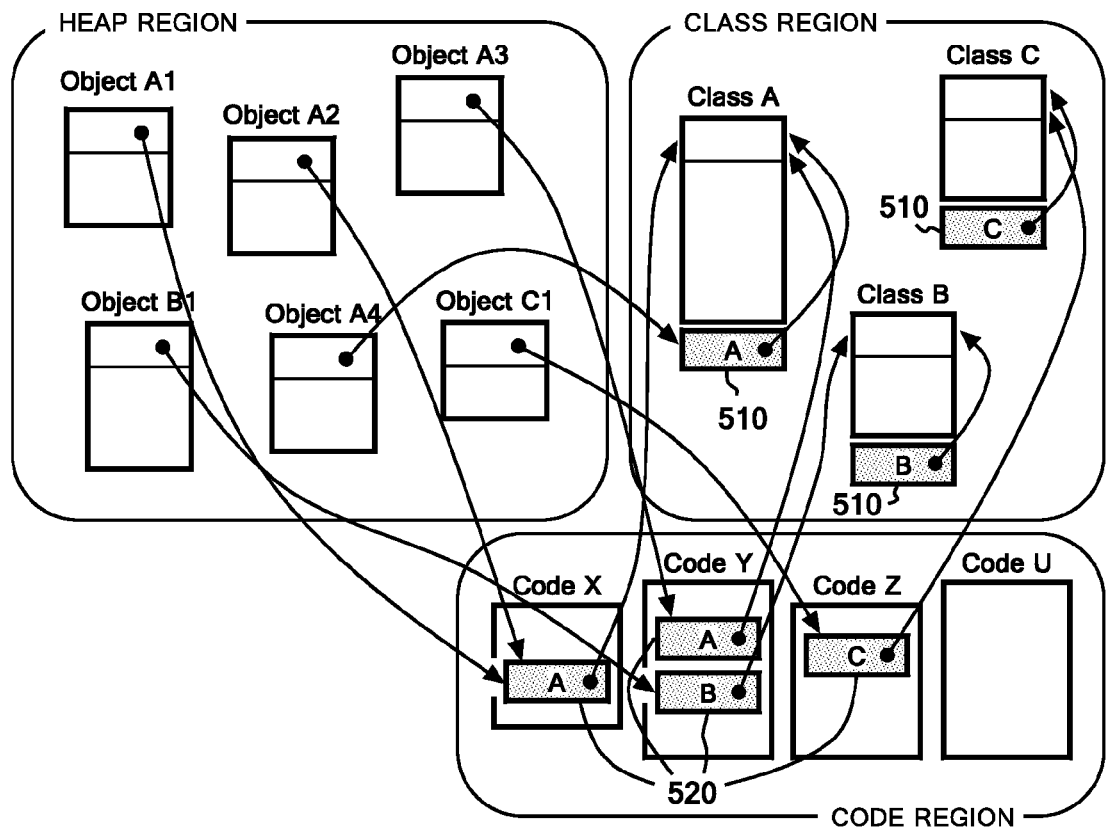
FIG. 5 is a diagram which shows an entire structure of a case where the present invention is applied to an object oriented runtime environment.

FIG. 5 shows an entire structure of a case where the present invention is applied to an object oriented runtime environment. Each of Objects A1, A2, A3, B1, and C1 points an allocation site descriptor 520 corresponding to a site at which Objects A1, A2, A3, B1, or C1 itself is created. Classes A, B, and C are pointed at by the allocation site descriptors 520 in Code X, Code Y, and Code Z. Each of Classes A, B, and C is provided with a self pointer 510 which points Class A, B, or C itself. Object A4 points the self pointer 510 for Class A as its allocation site descriptor.

Figure 6:
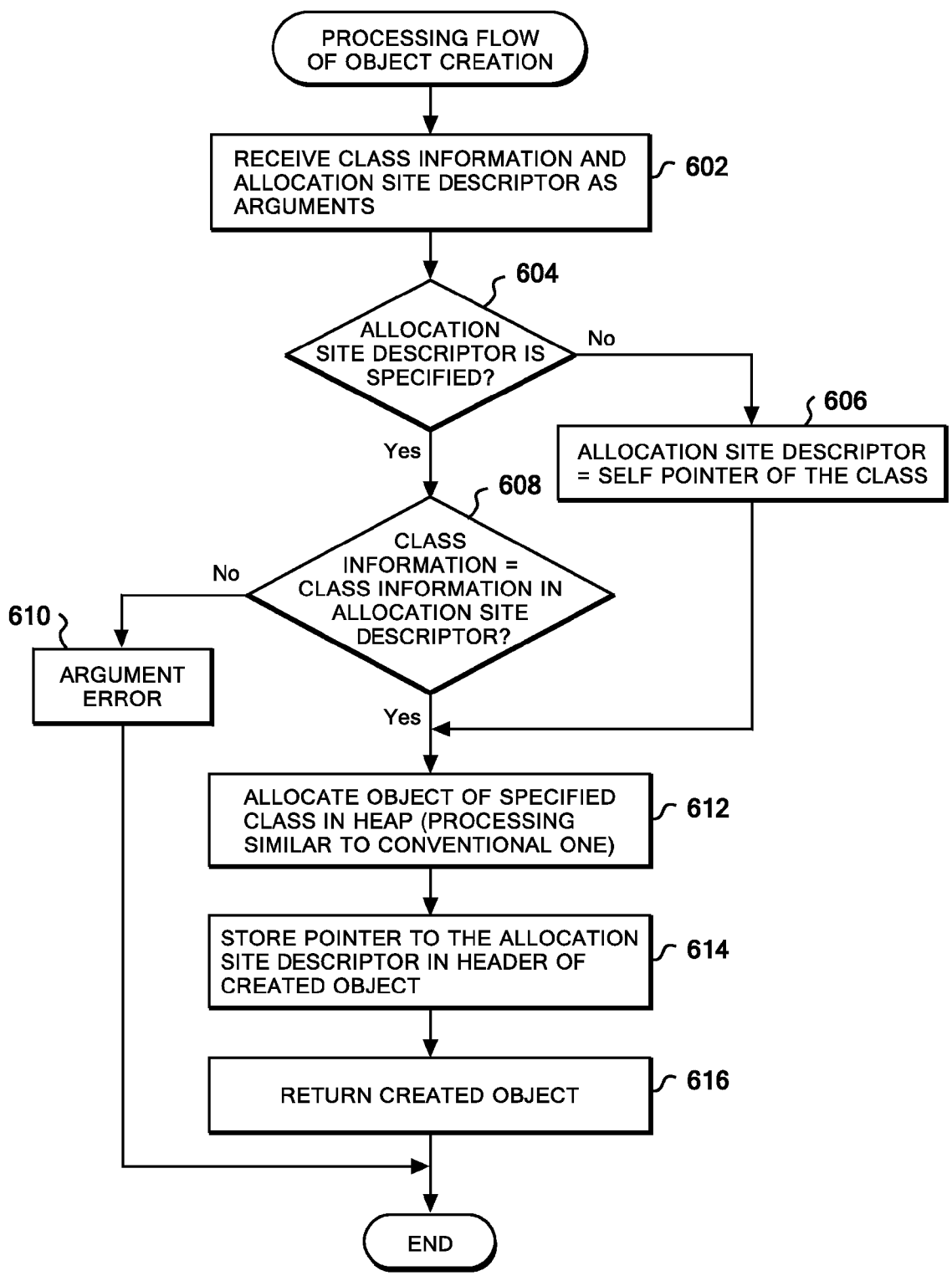
FIG. 6 is a diagram which shows a flowchart of object creation.

FIG. 6 shows a flowchart of the object creation according to an embodiment of the present invention. It is a feature of the embodiment to provide the allocation site descriptor in addition to the class information, at the time of object creation. If the descriptor is not specified, the self pointer of the class is used as an allocation site descriptor.

In Step 602, class information and an allocation site descriptor are received as arguments. In Step 604, it is checked whether or not the allocation site descriptor is specified. If the descriptor is specified, the processing proceeds to Step 608. If the descriptor is not specified, a self pointer of the class is used as the allocation site descriptor in Step 606, and the processing proceeds to Step 612. In Step 608, it is checked whether or not the class information is equal to the class information in the allocation site descriptor. If yes, the processing proceeds to Step 612. If no, the processing proceeds to Step 610 where the processing ends as an argument error. In Step 612, an object of the specified class is created in a heap. This processing is similar to that in the conventional object creation processing. In Step 614, a pointer to the allocation site descriptor is stored in a header of the created object. Lastly, the processing proceeds to Step 616 where the created object is returned.

Figure 7:
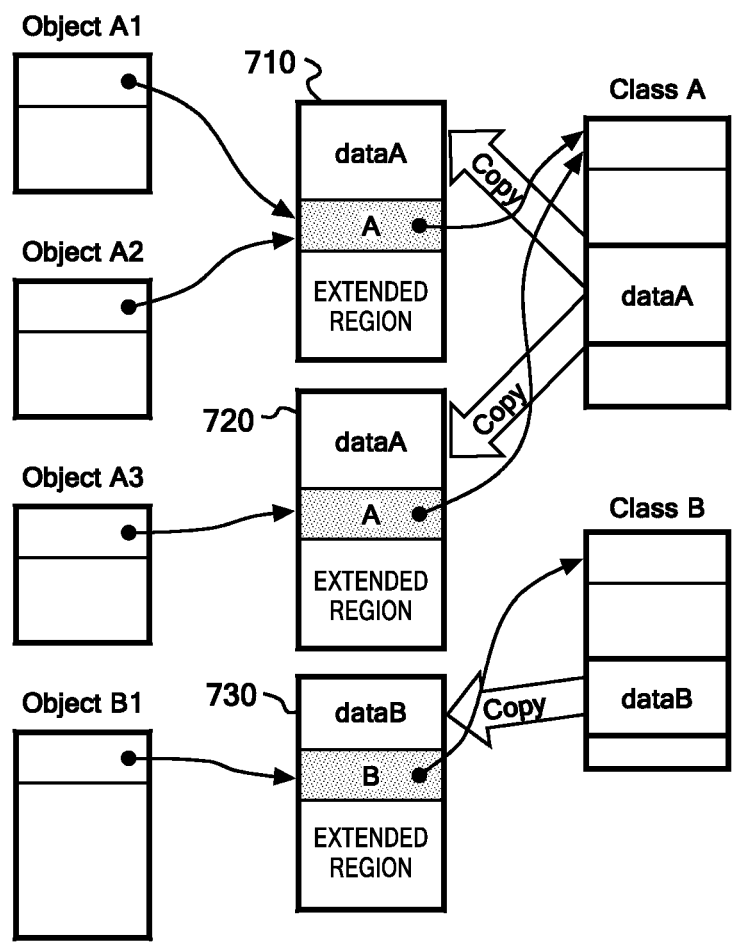
FIG. 7 shows an expansion to reduce a cost for memory reference.

In the described embodiment of the present invention, pointing an allocation site descriptor from an object header allows determination of an allocation site and collection of information for each allocation site. This operation, however, requires one extra memory reference to access the class information. FIG. 7 illustrates an embodiment to reduce a cost for the extra memory reference. Among information in a class, that which is frequently referred to and scarcely changed is copied into allocation site descriptors 710, 720, and 730. The information thus copied is denoted by dataA and dataB In FIG. 7. Here, the copying enables speeding up of access. Examples of the information which is frequently referred to and scarcely changed include a virtual function table and an object size.

The method of this embodiment requires an extra memory. However, this method involves a memory overhead smaller than a method does in which the size of an object header is simply increased, because the number of allocation sites is less than the number of objects.

Figure 8:
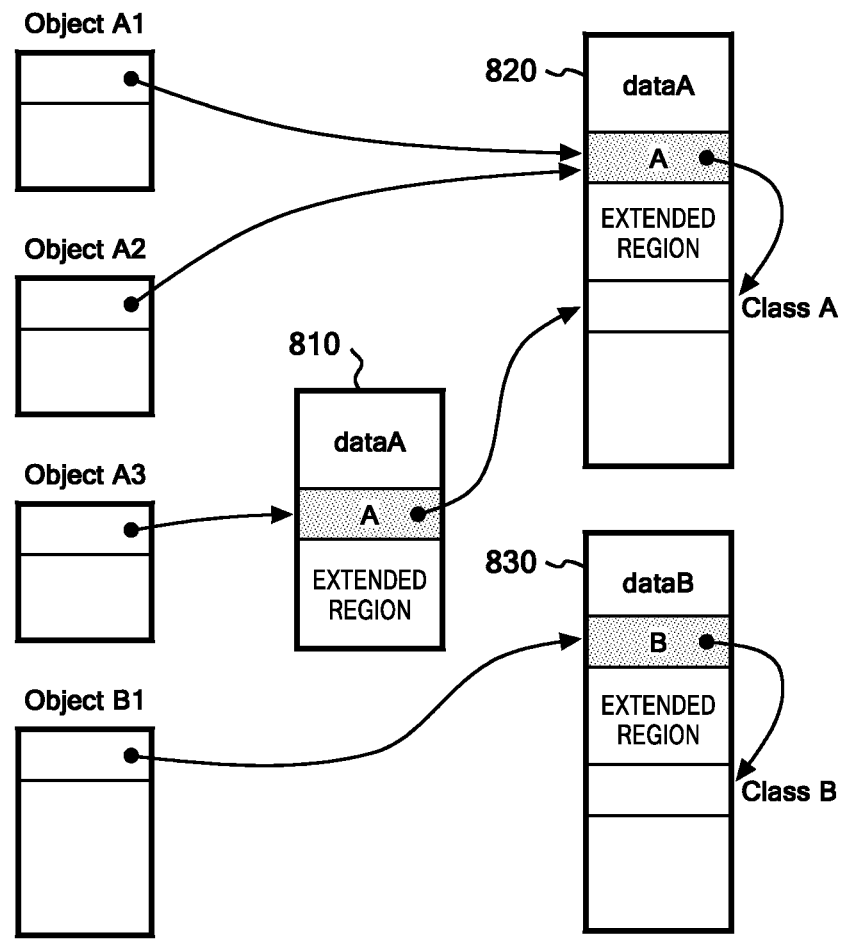
FIG. 8 is a diagram which shows an example of expansion in which a structure of a class itself is used as a first allocation site descriptor.

Further, the memory overhead in the previous embodiment can be reduced by using a structure of a class itself as a first allocation site descriptor for the class. FIG. 8 shows an example of an embodiment in which a structure of a class itself is used as a first allocation site descriptor. FIG. 8 shows that the copies dataA and dataB are made less than those made in the method in the previous embodiment since each of the allocation site descriptors 710 and 730 in FIG. 7 is included in a class structure itself.

In another embodiment, the allocation site descriptor of the present invention can be shared with multiple allocation sites of created objects as far as the objects belong to the same class. If a granularity of object information desired to be collected is on a class or package basis, the allocation site descriptors can be used in common in this manner. This can save regions for collecting information. In other words, depending on a desired granularity of object information to be collected, an allocation site descriptor is shared with multiple allocation sites.

In contrast, it is also possible to collect information to a finer degree in a case where not only an allocation site but also information on a context for calling the allocation site is desired to be tracked. In this case, the collecting of information is made possible by preparing allocation site descriptors respectively for contexts even though the contexts belong to the same allocation site. In other words, depending on a desired granularity of object information to be collected, different allocation site descriptors can be prepared for objects even though the objects belong to the same allocation site.

The present invention enables information on object allocation sites to be recorded and used with a small memory overhead. FIG. 9 shows a result of measurement of the number of object allocation sites. The measurement result is shown by taking multiple target Java applications in rows and taking total memory usage (RSS value for a java process reported by ps), the number of classes, the number of allocation sites, and the average number of objects in the heap in columns. The heap size is set to four times as large as the minimum available heap. The result in FIG. 9 shows that the number of classes and the number of allocation sites are much less than the number of objects.

The present invention enables adding a field for information collection to the allocation site descriptor and using the field for optimization at runtime. It is experimentally found that even the addition and the use of the field involve a small additional memory overhead because the number of allocation sites is much less than the number of objects.

An embodiment of the present invention discloses a method of using an already provided region as an allocation site descriptor. It is experimentally found that this method involves no additional memory overhead. In a method for a case where no self pointer is prepared for each class from the beginning, a small additional overhead is involved. Even in this case, it is not a serious problem because the number of classes is much less than the number of allocation sites as shown in FIG. 9.

Figure 10:
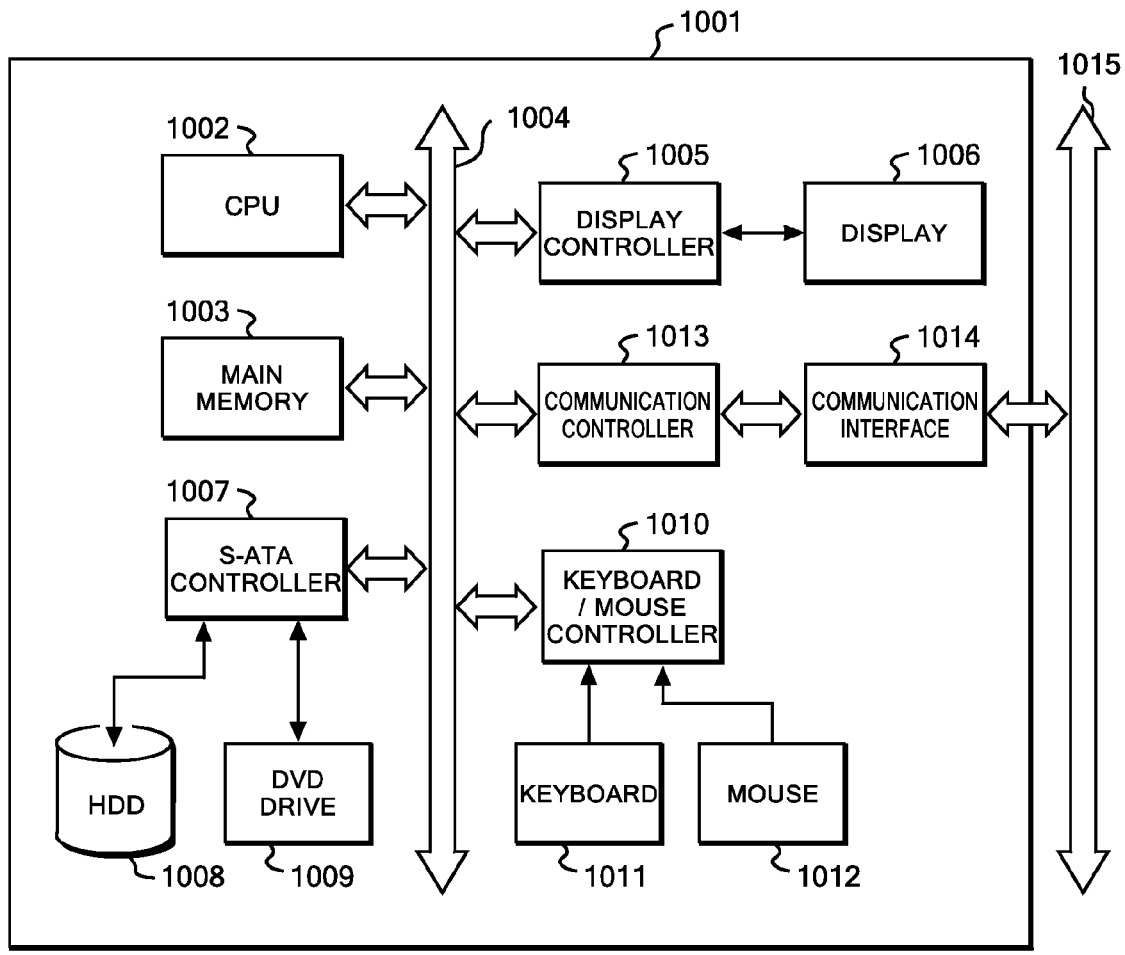
FIG. 10 shows an example of a block diagram of computer hardware.

FIG. 10 shows an example of a block diagram of computer hardware in the embodiment of the present invention. A computer system 1001 according to the embodiment of the present invention includes a CPU 1002 and a main memory 1003 which are connected to a bus 1004. The CPU 1002 is preferably based on a 32-bit or 64-bit architecture, and can employ, for example, XEON® series, CORE™ series, ATOM™ series, PENTIUM® series, and CELERON® series, of Intel Corporation, PHENOM™ series, ATHLON™ series, TURION™ series, and SEMPRON™ of Advanced Micro Devices, Inc, and the like.

A display 1006, such as an LCD monitor, is connected to the bus 1004 through a display controller 1005. The display 1006 is used, in order to manage the computer system 1001, for displaying, with an appropriate graphic interface, information on the computer system 1001 connected to a network through a communication line 1015 and information on software operating on the computer system 1001. A hard disk or silicon disk 1008 and a CD-ROM, DVD, or Blu-ray drive 1009 are further connected to the bus 1004 through an IDE or SATA controller 1007.

The hard disk 1008 stores an operating system, preferably, a program and data including codes of an object oriented runtime environment, so as to be loadable onto the main memory 1003. The data of objects of the present invention is stored in the hard disk 1008 or the main memory 1003 and processed by the CPU 1002.

The CD-ROM, DVD, or Blu-ray drive 1009 is used, as needed, to additionally introduce a program from a CD-ROM, a DVD-ROM, or a Blu-ray Disk to the hard disk 1008. A keyboard 1011 and a mouse 1012 are further connected to the bus 1004 through a keyboard/mouse controller 1010.

A communication interface 1014 complies with, for example, the ETHERNET® protocol, and is connected to the bus 1004 through a communication controller 1013. The communication interface 1014 plays a role of physically connecting the computer system 1001 with the communication line 1015, and provides a network interface layer to the TCP/IP communication protocol, being a communication function of the operating system of the computer system 1001. The communication line 1015 may be configured as a wired LAN environment, or as a wireless LAN environment which is based on wireless LAN connection standards, such as IEEE 802.11a/b/g/n.

The present invention is capable of recording information on an object allocation site with a small memory overhead. In addition, the present invention enables a processor to determine an object allocation site at application runtime. Accordingly, the present invention enables reallocation of an object or optimization of an object allocation by use of information on the object allocation site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 6, the flowchart and block diagrams in the Figure illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of recording an allocation site for an object, comprising:

replacing a pointer included in an object structure of said object and pointing to a class of said object with a pointer to an allocation site descriptor which includes information on an allocation site at which said object is created and a pointer to said class of said object;

using a common allocation site descriptor for objects created at a same allocation site;

accessing said class of said object by referring to said pointer to said class in said allocation site descriptor;

providing an extended region in said allocation site descriptor and collection therein object information for each allocation site at which said object is created; and optimizing object allocation at application runtime by use of said collected information.

2. The computer-implemented method according to claim 1, wherein a region in which said pointer to said class of said object is recorded for the use of the allocation is used as said allocation site descriptor.

3. The computer-implemented method according to claim 2, wherein in a case where said region in which said pointer to said class of said object is recorded does not exist, a self pointer which is a pointer to said class itself is used as said allocation site descriptor.

4. The computer-implemented method according to claim 1, further comprising copying part of class information into said extended region.

5. The computer-implemented method according to claim 4, wherein said class information is a class structure itself and is used as said allocation site descriptor.

6. The computer-implemented method according to claim 1, further comprising using a common allocation site descriptor for a plurality of allocation sites depending on a granularity of object information desired to be collected.

7. The computer-implemented method according to claim 1, further comprising preparing different allocation site descriptors even for a single allocation site depending on a granularity of object information desired to be collected.

8. A system of recording an allocation site for an object including a memory in communication with a processor, wherein the processor is configured to:

replace a pointer included in an object structure of said object and pointing to a class of said object with a pointer to an allocation site descriptor which includes information on an allocation site at which said object is created and a pointer to said class of said object;

use a common allocation site descriptor for objects created at a same allocation site;

access said class of said object by referring to said pointer to said class in said allocation site descriptor;

provide an extended region in said allocation site descriptor and collecting therein object information for each allocation site at which said object is created; and optimize object allocation at application runtime by use of said collected information.

9. The system according to claim 8, wherein a region in which said pointer to said class of said object is recorded for the use of the allocation is used as said allocation site descriptor.

10. The system according to claim 9, wherein in a case where said region in which said pointer to said class of said object is recorded does not exist, a self pointer which is a pointer to said class itself is used as said allocation site descriptor.

11. The system according to claim 8, wherein the processor is further configured to:

copy part of class information into said extended region.

12. The system according to claim 11, wherein said class information is a class structure itself and is used as said allocation site descriptor.

13. The system according to claim 8, wherein the processor is further configured to:

use a common allocation site descriptor for a plurality of allocation sites depending on a granularity of object information desired to be collected.

14. The system according to claim 8, wherein the processor is further configured to:

prepare different allocation site descriptors even for a single allocation site depending on a granularity of object information desired to be collected.

15. A computer program product for recording an allocation site for an object state, the computer program product comprising:

a non-transitory computer readable storage medium having computer readable program code embodied therewith, the computer readable program code comprising:

computer readable program code configured to:

replace a pointer included in an object structure of said object and pointing to a class of said object with a pointer to an allocation site descriptor which includes information on an allocation site at which said object is created and a pointer to said class of said object;

use a common allocation site descriptor for objects created at a same allocation site;

access said class of said object by referring to said pointer to said class in said allocation site descriptor;

provide an extended region in said allocation site descriptor and collecting therein object information for each allocation site at which said object is created; and optimizing object allocation at application runtime by use of said collected information.

* * * * *